United States Patent
Dittmer et al.

(10) Patent No.: US 9,252,625 B2
(45) Date of Patent: Feb. 2, 2016

(54) METHOD AND DEVICE FOR CHARGING A BATTERY OF AN ELECTRICAL DRIVE USING COMPONENTS OF THE ELECTRICAL DRIVE

(75) Inventors: Bernd Dittmer, Ludwigsburg (DE); Edwin Eberlein, Stuttgart (DE); Jie Ge, Stuttgart-Hausen (DE); Bernhard Mader, Kernen (DE); Christoph Van Booven, Markgroeningen-Unterriexingen (DE); Andreas Mittag, Markgroeningen (DE); Peter Eitner, Calw (DE); Bernd Eckert, Vaihingen an der Enz (DE)

(73) Assignee: Robert Bosch GmbH, Stuttgart (DE)

( * ) Notice: Subject to any disclaimer, the term of this patent is extended or adjusted under 35 U.S.C. 154(b) by 181 days.

(21) Appl. No.: 14/240,684

(22) PCT Filed: Jul. 26, 2012

(86) PCT No.: PCT/EP2012/064674
§ 371 (c)(1),
(2), (4) Date: Feb. 24, 2014

(87) PCT Pub. No.: WO2013/029891
PCT Pub. Date: Mar. 7, 2013

(65) Prior Publication Data
US 2014/0232301 A1    Aug. 21, 2014

(30) Foreign Application Priority Data
Aug. 29, 2011   (DE) .................. 10 2011 081 725

(51) Int. Cl.
*H02P 1/00*       (2006.01)
*H02J 7/00*       (2006.01)
(Continued)

(52) U.S. Cl.
CPC .............. *H02J 7/007* (2013.01); *B60L 3/0061* (2013.01); *B60L 3/04* (2013.01); *B60L 11/1803* (2013.01);
(Continued)

(58) Field of Classification Search
USPC ................ 318/130, 139, 400.31, 507, 400.3, 318/400.17, 400.2, 400.26, 801, 803; 363/10, 15, 21.12, 34, 123, 159, 37, 363/98, 108, 109, 61; 310/68 D, 160, 310/316.03; 320/140, 104, 145
See application file for complete search history.

(56) References Cited

U.S. PATENT DOCUMENTS

| | | |
|---|---|---|
| 4,492,912 A | 1/1985 | Nowakowski |
| 6,476,571 B1 | 11/2002 | Sasaki |

(Continued)

FOREIGN PATENT DOCUMENTS

| | | |
|---|---|---|
| DE | 69617026 | 6/2002 |
| DE | 102005016177 | 10/2006 |

(Continued)

OTHER PUBLICATIONS

International Search Report for Application No. PCT/EP2012/064674 dated Sep. 9, 2013 (English Translation, 3 pages).

*Primary Examiner* — Shawki S Ismail
*Assistant Examiner* — Jorge L Carrasquillo
(74) *Attorney, Agent, or Firm* — Michael Best & Friedrich LLP

(57) ABSTRACT

The invention relates to a multi-stage charging device for a battery of a battery operated electrical motor. The multistage charging device comprises a buck converter, an intermediate circuit and a boost converter in order to generate a suitable direct charging current from a (one or three-phase) alternating current provided by a power connection. According to the invention, components of the electrical drive are used for the boost converter and the intermediate circuit: the electrical motor functions as an intermediate circuit and the drive converter functions as a boost converter. According to the invention, the coupling of the electrical motor to the network-side buck converter occurs so that at least half the charging current flows through at least one of the at least three coils of the electrical drive. The invention further relates to a corresponding method and to a corresponding use of the drive components.

8 Claims, 5 Drawing Sheets

(51) Int. Cl.
  *B60L 11/18* (2006.01)
  *B60L 3/00* (2006.01)
  *B60L 3/04* (2006.01)
  *B60L 15/00* (2006.01)

(52) U.S. Cl.
  CPC ......... *B60L 11/1814* (2013.01); *B60L 11/1816* (2013.01); *B60L 15/007* (2013.01); *B60L 2210/12* (2013.01); *B60L 2210/14* (2013.01); *B60L 2210/30* (2013.01); *B60L 2210/40* (2013.01); *B60L 2220/54* (2013.01); *B60L 2220/56* (2013.01); *Y02T 10/641* (2013.01); *Y02T 10/7005* (2013.01); *Y02T 10/7225* (2013.01); *Y02T 10/7233* (2013.01); *Y02T 10/7241* (2013.01); *Y02T 90/127* (2013.01); *Y02T 90/14* (2013.01)

(56) References Cited

U.S. PATENT DOCUMENTS

| | | | |
|---|---|---|---|
| 6,977,475 B2 * | 12/2005 | Kuribayashi | F02N 11/04 290/40 C |
| 2011/0181236 A1 * | 7/2011 | Yang | B60L 11/1868 320/107 |
| 2011/0215743 A1 | 9/2011 | Fukatsu | |

FOREIGN PATENT DOCUMENTS

| | | | |
|---|---|---|---|
| JP | 6292304 | | 4/1987 |
| JP | 6327102 | | 2/1988 |
| JP | 08256405 | | 10/1996 |
| JP | 08256405 A | * | 10/1996 |
| WO | 2010103063 | | 9/2010 |
| WO | 2010142738 | | 12/2010 |

* cited by examiner

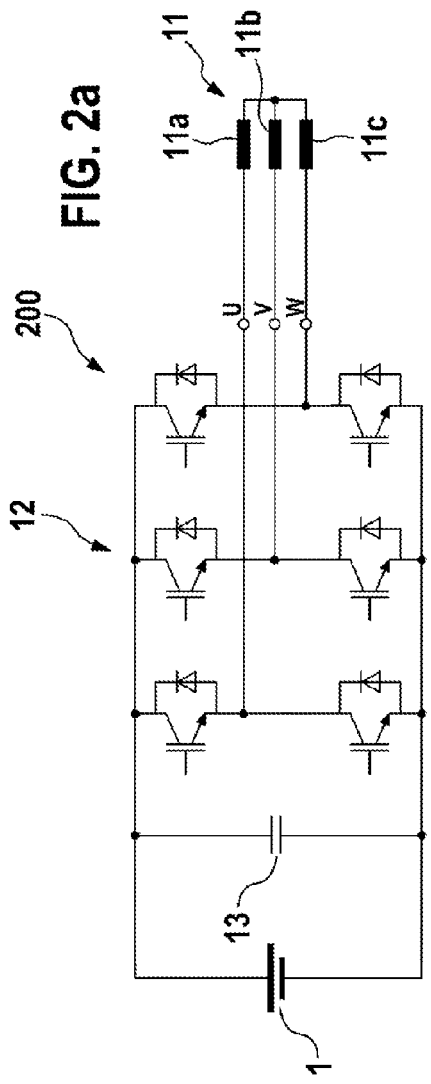
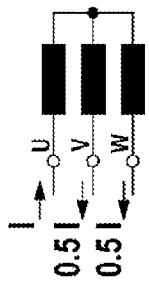
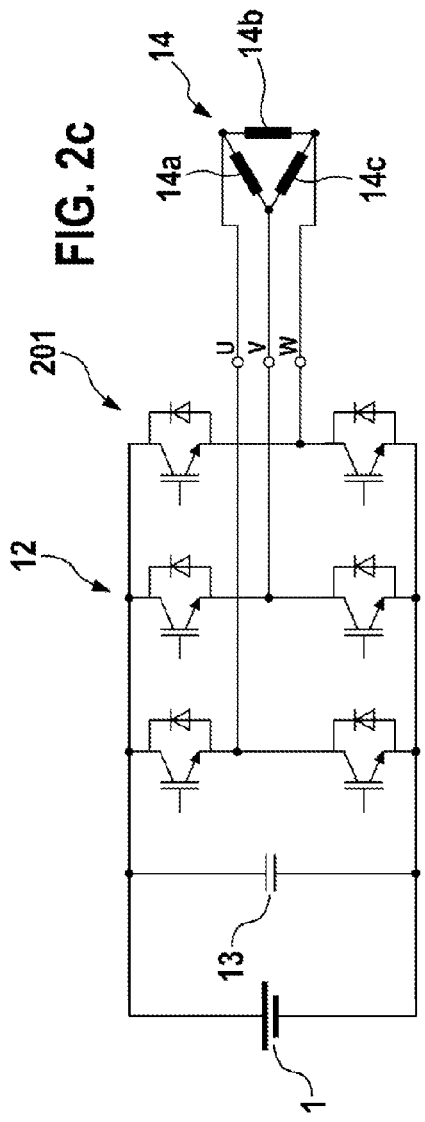

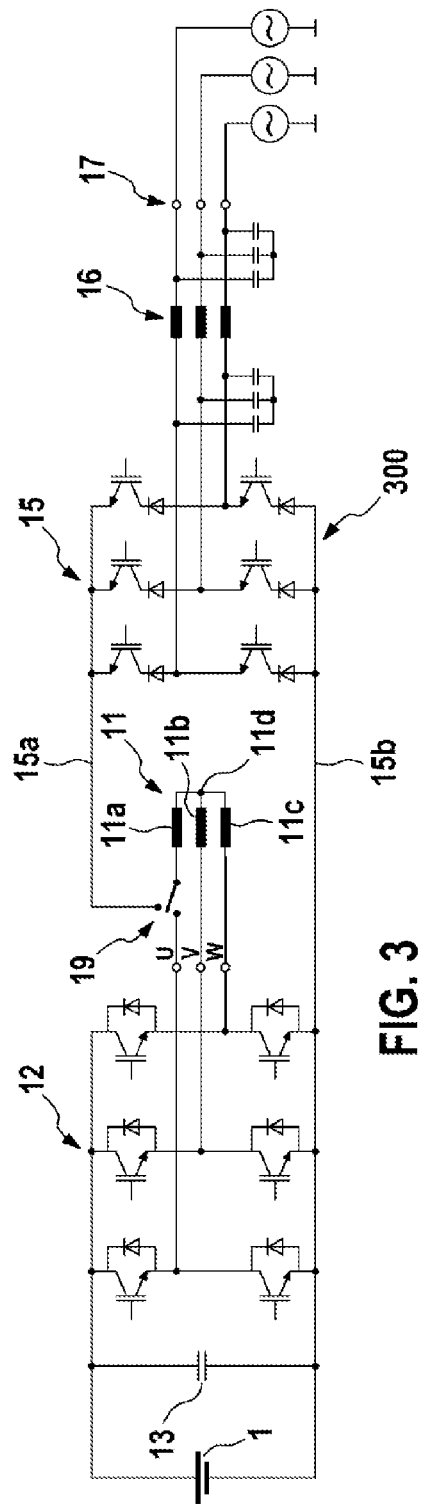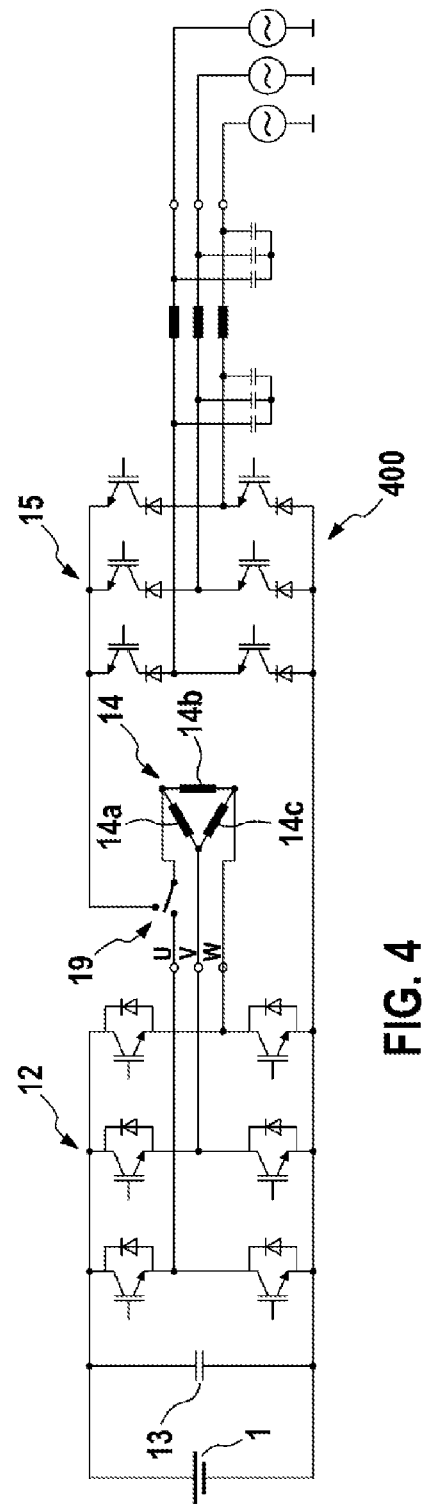
FIG. 3
FIG. 4

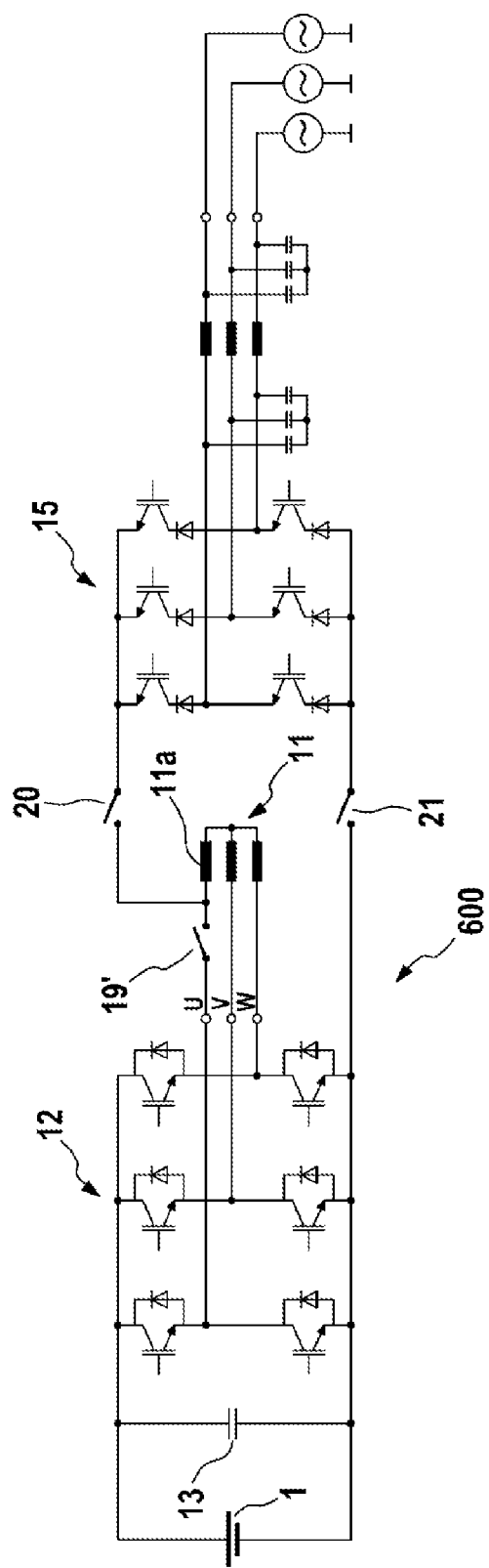
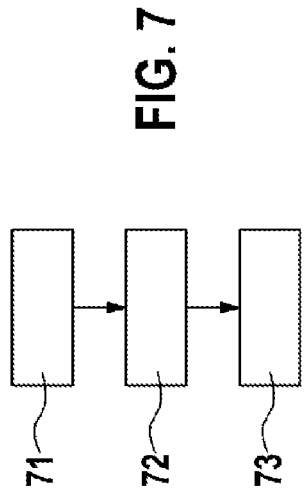
FIG. 6
FIG. 7

METHOD AND DEVICE FOR CHARGING A BATTERY OF AN ELECTRICAL DRIVE USING COMPONENTS OF THE ELECTRICAL DRIVE

BACKGROUND OF THE INVENTION

The present invention relates to a method and a device for charging a battery of an electric drive using components of the electric drive.

Electric drives are frequently supplied with energy by batteries or accumulators. Such batteries typically provide a DC voltage, which are frequently converted into an AC voltage with the aid of a drive converter or a DC/AC converter for operating the electric drive. The electric drive then converts the electric energy, for example, into a rotary motion or the like.

To charge these batteries, charging devices are often used which are independent of the drive and are implemented with the aid of separate electrical components. In electrically driven vehicles, the charging devices are often integrated into the vehicles in such a way that the vehicles must simply be connected to an electrical power supply network with the aid of electrical plug connections or the like. The bulk of the charging electronics is thus, for example, integrated into the vehicle.

If an AC voltage is provided by the power supply network, this AC voltage must be converted by the charging device into a DC voltage which is suitable for charging the battery. To implement charging devices of this kind, multistage circuit structures are therefore often used which, for example, may include a line filter, a step-down converter, an intermediate circuit, and a step-up converter.

In this context, when implementing a battery charging device, it is known from the publication WO 2010/103063 A1 to use the drive converter of the electric drive instead of a step-up converter provided specifically for the charging device, and to use the inductors of the electrical motor instead of an intermediate storage provided specifically for the charging device.

SUMMARY OF THE INVENTION

The present invention provides a charging device for charging a battery of a battery-operated electric drive according to one specific embodiment, wherein the charging device comprises a step-down converter which is connectable to a one- or three-phase AC network and is designed to provide a rectified current at its outputs; a (current) intermediate circuit which is electrically connectable to at least one output of the step-down converter and has at least one inductor for smoothing the current; a step-up converter which is designed to be electrically connected to the step-down converter at at least one input via the intermediate circuit and which is electrically connected to the battery at its outputs and which is suitable for converting the voltage provided by the step-down converter and/or the intermediate circuit into an equally high or higher voltage for charging the battery, wherein the step-up converter is formed by the drive converter of the electric drive and the intermediate circuit is formed by the electric motor of the electric drive. The device is characterized in that during charging of the battery, a first connection of the coil of the electric motor is electrically connected to the step-down converter, and during the operation of the electric motor as a motor (motor operation), a switch electrically connects the same connection of the coil to the step-up converter.

According to another specific embodiment, the present invention provides a method for providing a charging device for a battery of a battery-operated electric drive, having the steps of providing a step-down converter which is connectable to an AC network and is able to provide a rectified current of equal or lower voltage at its outputs; providing an intermediate circuit which is connectable to the outputs of the step-down converter and has coils for smoothing the rectified current; providing a step-up converter which is able to convert the smoothed current of the intermediate storage into a current having equal or higher voltage and is connected to the battery, wherein the electric motor of the electric drive is used to provide the intermediate storage and wherein the drive converter of the electric drive is used to provide the step-up converter; and wherein during charging of the battery, a first connection of a coil of the electric motor is electrically connected to the step-down converter, and wherein during the operation of the electric motor as a motor (motor operation or drive mode), a switch electrically connects the same connection of the coil to the step-up converter.

The present invention also relates to the use of a drive converter and an electric motor of an electric drive in a charging device for charging the battery of the electric drive, wherein the drive converter is used as a step-up converter and the electric motor is used as an intermediate circuit; wherein during charging of the battery, a first connection of a coil of the electric motor is electrically connected to the step-down converter; and wherein a switch is suitable for electrically connecting the same connection of the coil to the step-up converter.

It may be provided that the drive converter or the step-up converter of the charging device works as a step-up converter in charging operation, but functions as a step-down converter in motor operation.

In comparison to related art, the present invention has the advantage of making it possible to provide more economical charging devices using electrical components of the electric drive and corresponding charging methods.

In one advantageous embodiment, the battery to be charged is the drive battery of the battery-operated electric drive.

The starting point of the current invention is the use of components of a battery-operated electric drive, in particular the use of the electric motor and the drive converter, for implementing a multistage charging device having a step-up converter, step-down converter, and intermediate circuit. Contrary to the specific embodiments known in related art, the present invention proposes a particular coupling of the network-side step-down converter to the electric motor and the drive converter. In particular, it is proposed to design the electrical connection of the network-side step-down converter to the electric motor in such a way that all or at least half of the charging current flows through at least one of the at least three coils of the electric motor. This current corresponds to the current applied to the electric motor in the drive mode of the electric drive, at least for short periods.

In comparison to related art, the structure according to the present invention enables the use of conventional electric motors in which the neutral point does not have to be externally contactable, and also enables achieving higher inductance and thus smoother charging currents. The smoother charging currents allow gentler battery charging and ensure good controllability of the charging device.

BRIEF DESCRIPTION OF THE DRAWINGS

Additional features and advantages of specific embodiments of the present invention result from the following description with reference to the included drawings.

The following are shown:

FIG. 2a shows a schematic representation of a battery-operated electric drive having coils arranged in a star configuration;

FIG. 2b shows a schematic representation of the current flow in coils arranged in a star configuration;

FIG. 2c shows a schematic representation of a battery-operated electric drive having coils arranged in a delta configuration;

FIG. 3 shows a schematic representation of a first specific embodiment of a charging device according to the present invention;

FIG. 4 shows a schematic representation of a second specific embodiment of a charging device according to the present invention;

FIG. 6 shows a schematic representation of a fourth specific embodiment of a charging device according to the present invention;

FIG. 7 shows a schematic representation of a method for providing a charging device.

DETAILED DESCRIPTION

Figure 1:
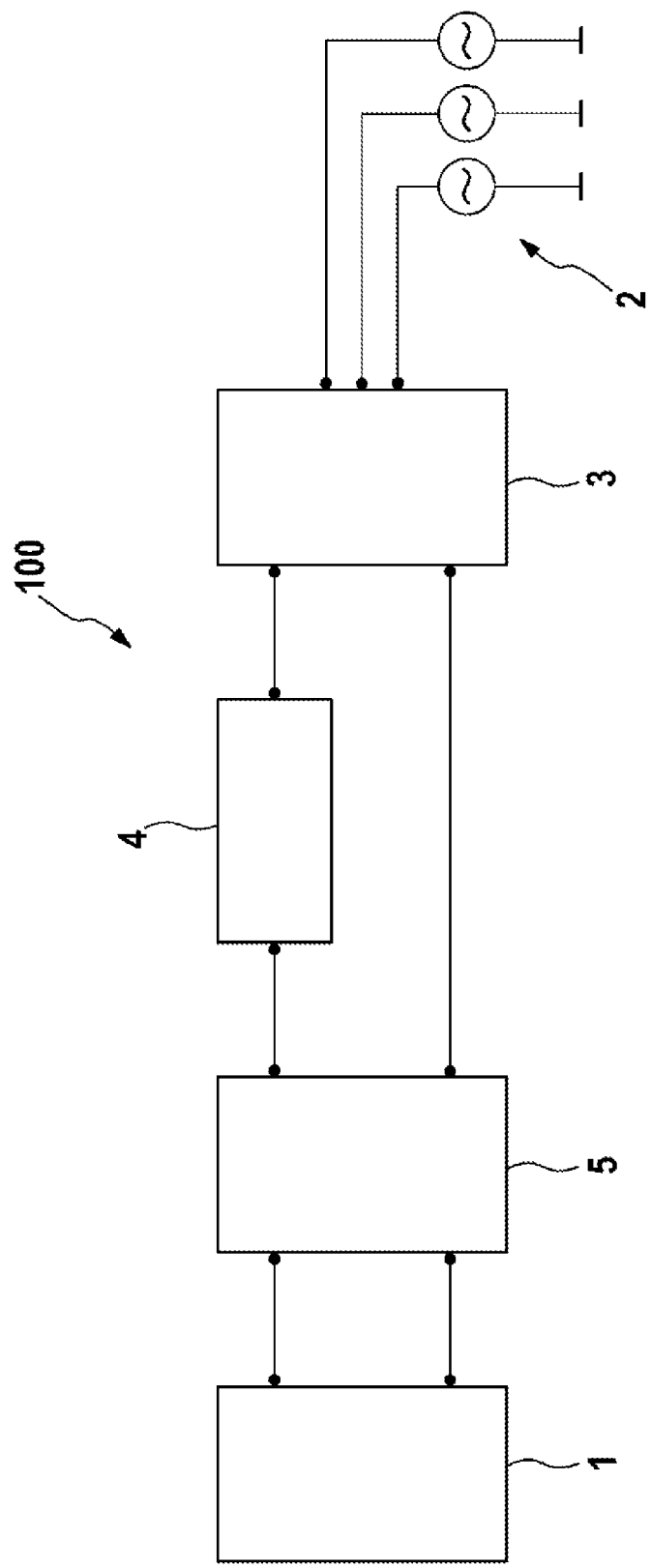
FIG. 1 shows a schematic representation of a multistage charging device.

In the figures, identical and functionally identical elements, features, and components are provided with the same reference characters, unless otherwise stated. For reasons of clarity and comprehensibility, components and elements in the figures are not necessarily shown in their true scale relative to one another.

FIG. 1 shows a schematic representation of a multistage charging device 100 for charging a battery or an accumulator 1. For this purpose, the battery 1 is electrically connected to an electrical network, for example, a public power supply network. For example, a three-phase alternating current may be provided by the electrical network. FIG. 1 shows a specific embodiment of the charging device 100 in which the connection 2 is formed as a three-phase alternating-current connection, in which an approximately sinusoidal alternating current is provided on each of three conductors, each of which is phase-shifted by 120° to the others. However, a connection to a one-phase AC network is also possible.

To connect to the power network, the charging device may also include a line filter (not shown in FIG. 1). The use of such a line filter is optional and is not mandatory for the operation of the charging device. However, it may be advantageous in order to prevent unintended feedback (voltage spikes, etc.) into the electrical network if the current drain varies with time. Such a variable current drain may occur, for example, when using a pulsed rectifier as described in more detail below, since this rectifier draws power from the network only intermittently. In this connection, a line filter may be used in particular to comply with the maximum permissible values for network disturbances which are stipulated by the operators of the power supply networks. Any line filters known in related art may be used, for example, the three lines of the network connection may be coupled to each other using capacitors.

The charging device 100 shown in FIG. 1 also includes a step-down converter 3, an intermediate circuit 4, and a step-up converter 5, in order to convert the (three-phase) AC voltage provided by the electrical network into an approximately constant charging voltage which is suitable for charging the battery 1. Depending on the battery, the charging voltage may be in the range of 100 V to 1000 V, in particular, in the range of 250 V to 450 V. The multistage structure of the charging device shown in FIG. 1 makes it possible to cover such a voltage range using the charging device. The charging device may of course also be supplemented by additional stages.

The step-down converter 3 is also frequently referred to as a buck converter and is a one-phase or multiphase rectifier which alternately connects the alternating current applied to the input-side to the charging device via the electrical network and thus cuts out components of the alternating current in such a way that it is possible to provide a rectified current on the output side which more or less resembles a smooth direct current, depending on the design and quality of the rectifier. The step-down converter 3 may, for example, be any current intermediate circuit-based rectifier. The step-down converter may be advantageously suitable for providing an output current having a voltage which is lower than or equal to the input voltage on average over time.

The intermediate circuit 4 is used to couple the step-down converter 3 and the step-up converter 5. It is used for further smoothing the approximate direct current which is output by the step-down converter (so-called DC intermediate circuit) and includes, for example, one or more coils or inductors or one or more storage inductors. In the ideal case, an ideal direct current is provided at the output of the intermediate circuit. In real applications, a smoothed current results, with larger inductance values resulting in greater smoothing. The intermediate circuit 4 in FIG. 1 is connected only between one output of the step-down converter 3 and one input of the step-up converter 5. Alternatively, the intermediate circuit may also be coupled to both outputs of the step-down converter 3 and both inputs of the step-up converter. The intermediate circuit is advantageously a current intermediate circuit or a DC intermediate circuit.

The step-up converter 5 shown in FIG. 1 is coupled between the step-down converter 3 or the intermediate circuit 4 and the battery 1 and supplies the battery with the intended charging DC voltage. The step-up converter 5 is used to provide an equally high or higher DC voltage to the battery based on the smoothed and rectified current provided on the input side. Step-up converters are often referred to as boost converters.

The multistage structure shown in FIG. 1 of the charging device 100 having a step-down converter 3 and a step-up converter 5 is used to provide the ideal charging voltage for charging the battery 1 by reducing the input voltage provided on the network side in the step-down converter 3 and/or increasing the voltage using the step-up converter 5.

In order to be able to provide the charging device 100 in a manner which is as simple, space-saving, and economical as possible, components of the electric drive are used according to the present invention for the step-up converter 5 and the intermediate circuit 4. Specifically, the drive converter of the electric drive is used for the step-up converter 5, and the electric motor or the electric machine of the electric drive is used for the intermediate circuit.

FIG. 2a schematically depicts the structure of a conventional battery-operated electric drive 200. The electric drive 200 includes a (drive) battery 1, an electric motor 11, and a drive converter 12. During the operation of the electric motor 11 as a motor (so-called motor operation), the battery 1 is used as a current or voltage source and approximately provides a DC voltage (which decreases slowly over time in the course of the discharging of the battery). The drive converter 12 is used to convert the direct current provided by the battery into an alternating current and may also be referred to as an inverter or DC/AC converter. During the operation of the electric motor as a motor (motor operation), it may function in particular as a step-down converter and thus provide a voltage to the electric motor 11 which is equal to or smaller than the battery voltage. The drive converter 12 depicted in FIG. 2 is a three-phase pulsed inverter or pulse-width-modulation inverter, which breaks down the DC voltage provided by the battery in the three branches U, V, and W into AC voltage pulses, each shifted by 120°, and feeds them to the electric motor 11. In addition, FIG. 2a shows an optional capacitor 13 as an example, which may be connected to the battery 1 in parallel and is used to provide the current pulses in motor operation. It goes without saying that instead of or in addition to the capacitor 13, other electronic components may be provided to shape the drive current.

The drive converter 12 shown in FIG. 2a consists of a total of three branches U, V, W, each having two switching transistors and two diodes. The conversion into alternating current may be controlled in a known manner using switching transistors. Since the operation of pulsed inverters is known in related art, a detailed description of the activation is omitted for reasons of clarity. Alternatively to the drive converter 12 shown in FIG. 2a, any other DC/AC converters may of course be used.

The electric motor 11 shown in FIG. 2a is a three-phase electric motor having three drive coils or inductors 11a, 11b, 11c. Instead of three drive coils, multiple coils may also be used, but advantageously integer multiples of three coils; in other words, instead of three coils, for example, three coil pairs may be used. The mention of only three coils below for reasons of simplicity is to be understood also to include specific embodiments having corresponding coil pairs, triplets, etc.

The coils 11a, 11b, 11c shown in FIG. 2a are arranged and connected in a star configuration; that is, one end of each of the three coils 11a, 11b, 11c is connected to a branch U, V, W of the drive converter 12, whereas the other ends of the three coils 11a, 11b, 11c are each connected to each other in a star configuration at a neutral point. During the operation of the electric motor 11, that is, when the electric motor is operated as a drive motor and drives an object to be driven, the current flows temporarily in such a way that all of it flows through one of the three branches U, V, W and one of the three coils 11a, 11b, 11c, and one-half flows back through each of the two other branches and coils. This is illustrated schematically in FIG. 2b.

FIG. 2c shows a specific embodiment of an electric drive 201 in which the coils 14a, 14b, 14c of the electric motor 14 are arranged and connected in a delta configuration. The embodiments of the electric motor 11 in FIG. 2a are similarly applicable here. In the operating mode of the electric motor 14, all of the current flows temporarily through one branch U and one-half flows back through the two other branches V, W and the coils 14a, 14b.

FIG. 3 is a schematic representation of a charging device 300 according to the present invention for charging a battery 1 according to a first specific embodiment. The charging device 300 for charging the battery 1 corresponds to the two-stage charging device shown in FIG. 1 and consists of an (optional) line filter 16, a step-down converter 15, an intermediate circuit 11, and a step-up converter 12. The step-down converter 15 is a three-phase rectifier which rectifies the one- or three-phase alternating current from the electrical network which is applied to the connection 17 and thus approximately converts it into a direct current, depending on the quality of the rectification. Using a suitable activation of the step-down converter 15, the step-down converter is able to provide a current of equal or lower voltage compared to the voltage provided on the network side. A line filter 16 having inductors and capacitors is used to prevent or reduce unintended feedback into the electrical network. The intermediate circuit 11 includes multiple inductors and is used for smoothing the rectified current provided by the step-down converter 15. The step-up converter 12 is a three-phase pulse-width-modulation inverter and is able to provide a voltage at its outputs connected to the battery 1 which, on average over time, is equal to or greater than the voltage provided by the step-down converter 15 or the intermediate circuit 11. It is possible to adjust the voltage applied to the battery 1 to the required charging voltage in a range from 100 V to 1000 V, in particular in a range from 250 V to 450 V, via a corresponding activation of the transistors in the step-down converter 15 and the step-up converter 12.

The battery 1 is advantageously the drive battery of an electric motor 2. For example, the battery 1 may be a traction battery of an electrically driven vehicle, for example, an automobile. The structure of the electric drive may correspond to the electric drives proposed in FIGS. 2a to 2c.

An essential aspect of the charging device 300 according to the present invention depicted in FIG. 3 and the charging devices 400 to 600 further below is that the step-up converter 12 and the intermediate circuit 11 of the charging device are implemented using components of the electric drive which is connected to the battery 1. Specifically, the step-up converter 12 is formed by the drive converter of the electric drive and the intermediate circuit is formed by the electric motor of the electric drive or the coils/inductors therein. As already depicted above with reference to FIG. 2, the drive converter is used in the operating mode or driving mode for converting the DC voltage originating from the battery into an AC voltage for the electric motor, and is used in the charging mode as a step-up converter. As already depicted above with reference to FIG. 2, the electric motor is used in the drive mode or driving mode for driving a device to be driven, for example, the wheels of an electric vehicle, and is used in the charging mode as an intermediate circuit for smoothing the rectified current.

The use of drive components such as the drive converter and the electric motor in a charging device for the drive battery is already described in the above-mentioned publication WO2010/103063. However, this publication instructs to connect the coils of the electric motor in a star configuration and to make the neutral point of the electric motor externally accessible for coupling the step-down converter. The present invention according to the specific embodiment shown in FIG. 3 proposes on the other hand to connect the coils 11a, 11b, 11c of the electric motor 11 in a star configuration without making the neutral point externally accessible; that is, the coils are connected directly to each other on a first end, without the neutral point 11d being directly contacted with the step-down converter 15 or the step-up converter 12 or other components. With respect to the second coil ends of the coils 11a, 11b, 11c, a first coil 11a is switchably connected to a first branch U of the step-up converter 12, while the other coils 11b, 11c are preferably securely connected to the second or third branch V or W of the step-up converter 12. In the drive mode, the switch 19 is closed, so that the second end of the coil 11a is connected to the first branch U of the drive converter 12 or the step-up converter 12 of the charging device, but not to the step-down converter 15. The resulting arrangement in this switch position essentially corresponds to the electric drive shown in FIG. 2a and has the same functionality. The switching elements of the step-down converter 15 which are still contacted via the branch 15b impair the functionality at most within the limits of parasitic effects, so that reference may be made to the above embodiments for FIG. 2a. In particular, the current flow shown in FIG. 2b exists temporarily in the drive mode.

Any switches known in related art may be used as a switch. In particular, power semiconductors which are matched to each of the current flows and voltages may be used.

To charge the drive battery 1, the switch 19 is switched over in such a way that the connection of the second end of the coil 11a to the first branch U of the step-up converter 12 is broken and is instead connected to the step-down converter 15 via the feed line 15a. Since the interconnection of the intermediate circuit 11 and the step-down converter 15 may ideally be regarded as a DC voltage source, the current curve depicted in FIG. 2b also results in charging operation under this arrangement. This does not break the connection of the coils 11a, 11b, 11c in a star configuration.

The specific embodiment of the present invention shown in FIG. 3 thus differs fundamentally from the circuit described in the publication WO2010/103063, in which the current is distributed equally across the three coils of the electric motor in charging operation. In comparison, the charging device 300 has multiple advantages: since the neutral point of the electric motor in the charging device 300 does not have to be externally contacted, it is possible to use conventional electric motors in this circuit. In particular, it is not necessary to use specially manufactured electric motors having a contacted neutral point, so that there are also no restrictions with respect to the choice of electric motors or suppliers. In addition, a higher inductance results in the arrangement according to the present invention, and since the charging currents through each of the individual coils, at I or 0.5*I, are each larger than the currents in the arrangement of WO2010/103063, which are each only ⅓*I, a stronger magnetic field also results. Since the charging currents are typically lower than the currents during the operation of the electric motor as a motor, no adjustment of the sizing is required for the charging device 300 according to the present invention. However, it may be pointed out that the distribution of the charging current specified above at 0.5 may be influenced via the activation of the step-up converter, and this ratio applies to a symmetrical activation of the branches of the step-up converter/drive converter. If there is only a temporary deviation from a symmetrical activation, the ratio specified above may be reached at least on average over time. The current flow generated in the arrangement according to the present invention corresponds in each case to the current flow in the drive mode of the electric motor; that is, the electric motor also functions during charging operation with optimal and thus high inductance. The inductance which is higher in comparison to related art allows, as mentioned above, the generation of smoother charging current curves and thus gentler charging of the battery 1 and good controllability.

The charging device 300 may advantageously be supplemented by a locking device for locking the electric motor 11 during charging, in order to prevent rotation of the electric motor 11 during charging. For example, a transmission pawl, a parking lock, or the like is suitable as a locking device in electrically driven vehicles.

FIG. 4 is a schematic representation of a charging device 400 according to the present invention according to a second specific embodiment. In this specific embodiment, in comparison to the charging device 300, the coils of the electric motor/intermediate circuit 14 are not interconnected in a star configuration, but rather in a delta configuration. During charging operation, the step-down converter 15 is connected via the switch 19 to both coils 14a, 14b of the electric motor, whereas in drive mode, the switch 19 connects both coils 14a and 14b to the first branch of the drive converter 12 or the step-up converter 12 of the charging device. In comparison to the star connection, in the delta connection under symmetrical activation of the step-up converter/drive converter 12, only two of the three coils are supplied with current, namely, the coils 14a and 14b, the current under symmetrical activation of the step-up converter 12 being distributed equally to both coils.

Figure 5:
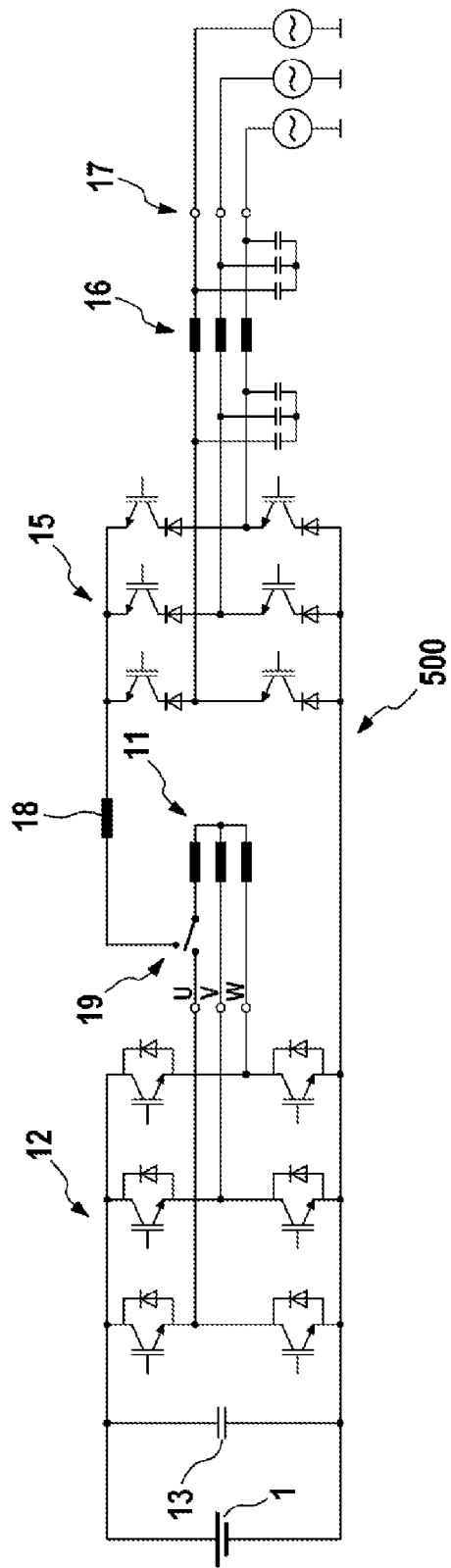
FIG. 5 shows a schematic representation of a third specific embodiment of a charging device according to the present invention.

FIG. 5 is a schematic representation of a charging device 500 according to the present invention according to a third advantageous specific embodiment. This specific embodiment corresponds to the specific embodiment shown in FIG. 3 to the greatest possible extent, but in addition has an additional inductor 18. The additional inductor 18 may be advantageous if the inductance provided by the electric motor 11 is not adequate to generate a sufficiently constant direct current during charging operation. The additional inductor 18 may be used for further reducing residual ripple in the current rectified by the step-down converter 15 and the intermediate circuit 11 and for achieving better smoothing of the rectified current from the step-down converter 15. This may be advantageous in particular for protecting the battery 1 if the residual current ripple otherwise occurring during charging could reduce the service life of the battery. The additional inductor shown in FIG. 5 may of course also be used in all other specific embodiments of the present invention, in particular, in conjunction with the delta connection in FIG. 4.

FIG. 6 is a schematic representation of a charging device 600 according to the present invention according to a fourth advantageous specific embodiment. In comparison to the specific embodiment shown in FIG. 3, the switch 19' is designed in such a way that it functions only as an interrupter of the connection of one coil 11a of the electric motor to the corresponding branch of the step-up converter 12. In addition, additional switches 20 and 21 are provided for preferably decoupling the step-down converter 15 of the charging device and the accompanying parasitic capacitances and inductances from the electric motor during the operation of the electric motor (drive mode). This may cause an increase in efficiency and improve the electromagnetic compatibility. It is of course also possible to provide only one of the two switches 20 or 21. The switches 19', 20, and 21 may also be used in any combination in the specific embodiments proposed above.

FIG. 7 schematically depicts a method for providing a charging device for a battery 1 of a battery-operated electric drive. Here, in a step 71, a step-down converter 15 is provided according to one of the above specific embodiments. The step-down converter is connectable to an AC network and is able to provide a rectified current of equal or lower voltage at its outputs. In a step 72, an intermediate circuit 11; 14 according to one of the above specific embodiments is provided, which is connectable to the outputs of the step-down converter 15 and has coils 11a; 11b, 11c; 14a, 14b, 14c for smoothing the rectified current. In a step 73, a step-up converter 12 according to one of the above specific embodiments is provided, which is able to convert the smoothed current of the intermediate storage 11; 14 into a current having equal or higher voltage and is connected to the battery 1, wherein the electric motor of the electric drive is used to provide the intermediate storage 11; 14 and wherein the drive converter of the electric drive is used to provide the step-up converter 12 and wherein during charging of the battery 1, a first connection of a coil 11a; 14a of the electric motor 11; 14 is electrically connected to the step-down converter 15 and wherein during the operation of the electric motor, a switch 19; 19' electrically connects the same connection of the coil 11a; 14a to the step-up converter 12. The individual method steps do not necessarily have to be carried out in the sequence specified above.

The charging devices according to the present invention are advantageously designed in such a way that they are suitable both for using a three-phase alternating current and using a one-phase alternating current. Only two of the three input bridge branches of the step-down converter must be used for one-phase operation. In this operating state, activation is to take place such that the current source inverter on the input side is driven in a controlled manner and the step-up converter on the output side assumes the PFC (power factor corrector) functionality. It must only be ensured with the input stage that the average output voltage of the step-down converter is lower than the battery voltage, in order for the step-up converter on the output side to be able to function.

The invention claimed is:

1. A charging device for charging a battery of a battery-operated electric drive, the charging device comprising:
   a step-down converter which is connectable to a one- or three-phase AC network and is designed to provide a rectified current at its outputs;
   an intermediate circuit which is electrically connectable to at least one output of the step-down converter and has at least one inductor for smoothing the current; and
   a step-up converter which is designed to be electrically connected to the step-down converter at least one input via the intermediate circuit and is electrically connected to the battery at its outputs and which is suitable for converting the voltage provided by the step-down converter and/or the intermediate circuit into an equally high or higher voltage for charging the battery,
   wherein
   the step-up converter is formed by the drive converter of the electric drive and the intermediate circuit is formed by an electric motor of the electric drive, the electric motor including at least three coils which are connected to each other in a delta configuration; and
   during charging of the battery, a first connection of the coil of the electric motor is electrically connected to the step-down converter, and a switch ensures that, during charging of the battery, half of the respective charging current flows on average over time through one of the coils of the electric motor, and, during the operation of the electric motor, the switch electrically connects the same connection of the coil to the step-up converter.

2. The charging device as claimed in claim 1, wherein the electric motor comprises at least three coils which are connected to each other in a star configuration or in a delta configuration.

3. The charging device as claimed in claim 2, wherein the switch ensures that during charging of the battery, all charging current flows through one of the coils of the electric motor.

4. The charging device as claimed in claim 1, wherein the at least three coils of the electric motor are connected to each other in a star configuration and only connections to the at least three coils of the electric motor exist from the neutral point.

5. A method for providing a charging device for a battery of a battery-operated electric drive, having the steps of:
   providing a step-down converter which is connectable to an AC network and is able to provide a rectified current of equal or lower voltage at its outputs;
   providing an intermediate circuit which is connectable to the outputs of the step-down converter and has coils for smoothing the rectified current;
   providing a step-up converter which is able to convert the smoothed current of the intermediate storage into a current having equal or higher voltage and is connected to the battery,
   wherein an electric motor of the electric drive, the electric motor including at least three coils which are connected to each other in a delta configuration, is used to provide the intermediate storage and wherein the drive converter of the electric drive is used to provide the step-up converter; and
   wherein during charging of the battery, a first connection of a coil of the electric motor is electrically connected to the step-down converter, and a switch ensures that, during charging of the battery, half of the respective charging current flows on average over time through one of the coils of the electric motor, and, wherein during the operation of the electric motor, the switch connects the same connection of the coil electrically to the step-up converter.

6. The method as claimed in claim 5, wherein during charging of the battery, all charging current flows through one of the coils of the electric motor.

7. The method as claimed in claim 5, wherein the at least three coils or inductors of the electric motor are connected to each other in a star configuration and only connections to the at least three coils of the electric motor exist from the neutral point.

8. The use of a drive converter and an electric motor of an electric drive in a charging device for charging the battery of the electric drive, wherein
   the electric motor includes at least three coils which are connected to each other in a delta configuration;
   a step-down converter is connectable to a one- or three-phase AC network and is designed to provide a rectified current at its outputs;
   the drive converter is used as a step-up converter and the electric motor is used as an intermediate circuit;
   the intermediate circuit is electrically connectable to at least one output of the step-down converter and has at least one inductor for smoothing the current;
   the step-up converter is designed to be electrically connected to the step-down converter at least one input via the intermediate circuit and is electrically connected to the battery at its outputs and is suitable for converting the voltage provided by the step-down converter and/or the current intermediate circuit into an equally high or higher voltage for charging the battery;
   during charging of the battery, a first connection of a coil of the electric motor is electrically connected to the step-down converter; and
   wherein a switch is used to ensure that, during charging of the battery, half of the respective charging current flows on average over time through one of the coils of the electric motor, and, during the operation of the electric motor, the switch is suitable for electrically connecting the same connection of the coil to the step-up converter.

* * * * *